United States Patent
Bai

(10) Patent No.: US 10,616,393 B2
(45) Date of Patent: Apr. 7, 2020

(54) METHOD FOR CALL CONTROL AND RELATED PRODUCTS

(71) Applicant: Guangdong Oppo Mobile Telecommunications Corp., Ltd., Dongguan, Guangdong (CN)

(72) Inventor: Jian Bai, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/007,521

(22) Filed: Jun. 13, 2018

(65) Prior Publication Data

US 2018/0375983 A1 Dec. 27, 2018

(30) Foreign Application Priority Data

Jun. 21, 2017 (CN) .......................... 2017 1 0475909

(51) Int. Cl.
*H04M 1/663* (2006.01)
*H04M 3/436* (2006.01)
(Continued)

(52) U.S. Cl.
CPC ....... *H04M 1/663* (2013.01); *H04M 1/72527* (2013.01); *H04M 1/72569* (2013.01);
(Continued)

(58) Field of Classification Search
CPC ........ H04M 3/436; H04M 1/663; H04M 1/65; H04M 3/42059; H04M 3/4288;
(Continued)

(56) References Cited

U.S. PATENT DOCUMENTS 8,594,298 B2 * 11/2013 Klein ................ H04M 3/42161
379/211.02
2004/0203673 A1 * 10/2004 Seligmann ........ H04M 1/72547
455/415
(Continued)

FOREIGN PATENT DOCUMENTS

CN 102055848 A 5/2011
CN 105554237 A 5/2016
(Continued)

OTHER PUBLICATIONS

International search report issued in corresponding international application No. PCT/CN2018/088893 dated Aug. 17, 2018.
(Continued)

*Primary Examiner* — Nathan S Taylor
(74) *Attorney, Agent, or Firm* — Young Basile Hanlon & MacFarlane, P.C.

(57) ABSTRACT

The disclosure provides a method for call control and related products. The method includes the following. In response to a mobile terminal receiving an incoming call request, a priority of the incoming call request is obtained; when the priority of the incoming call request is lower than a preset priority, whether a user is in a first state is determined; based on a determination that the user is in the first state, the incoming call request is rejected.

15 Claims, 7 Drawing Sheets

(51) Int. Cl.
*H04M 1/725* (2006.01)
*H04M 3/42* (2006.01)
*H04W 4/02* (2018.01)

(52) U.S. Cl.
CPC ....... *H04M 3/42374* (2013.01); *H04M 3/436* (2013.01); *H04W 4/027* (2013.01); *H04M 2250/12* (2013.01); *H04M 2250/52* (2013.01)

(58) Field of Classification Search
CPC ......... H04M 2201/18; H04M 3/42153; H04M 3/42365; H04M 7/0033; H04M 1/72527; H04M 2250/12; H04M 2250/52; H04W 4/16; H04W 4/027
USPC ....... 455/414.1; 379/373.01, 142.05, 142.07, 379/201.1, 211.02
See application file for complete search history.

(56) References Cited

U.S. PATENT DOCUMENTS

| | | | | |
|---|---|---|---|---|
| 2004/0223599 | A1* | 11/2004 | Bear | H04M 3/436 379/207.02 |
| 2009/0088168 | A1* | 4/2009 | Varanasi | H04M 1/663 455/445 |
| 2009/0143013 | A1* | 6/2009 | Hatano | H04M 1/57 455/41.3 |
| 2009/0170480 | A1* | 7/2009 | Lee | H04L 51/36 455/414.1 |
| 2010/0067677 | A1* | 3/2010 | Fong | H04M 1/57 379/142.05 |
| 2010/0296646 | A1* | 11/2010 | Hemm | G06Q 10/107 379/265.02 |
| 2011/0299668 | A1* | 12/2011 | Davies | H04M 3/428 379/88.12 |
| 2012/0084053 | A1* | 4/2012 | Yuen | A61B 5/0002 702/160 |
| 2013/0016819 | A1* | 1/2013 | Cheethirala | H04M 1/65 379/142.05 |
| 2013/0078963 | A1* | 3/2013 | Prasad | H04M 1/6091 455/414.1 |
| 2013/0322615 | A1* | 12/2013 | Oristian | H04M 3/5232 379/266.06 |
| 2013/0324071 | A1* | 12/2013 | Huh | H04M 3/02 455/404.1 |
| 2013/0332721 | A1* | 12/2013 | Chaudhri | G06F 3/016 713/100 |
| 2014/0134968 | A1* | 5/2014 | Raouf | H04W 4/90 455/404.1 |
| 2014/0206327 | A1* | 7/2014 | Ziemianska | G06F 3/011 455/418 |
| 2014/0206328 | A1* | 7/2014 | Varoglu | H04M 1/00 455/418 |
| 2014/0256298 | A1* | 9/2014 | Moss | H04W 4/12 455/414.1 |
| 2015/0003595 | A1* | 1/2015 | Yaghi | G06Q 10/063 379/85 |
| 2015/0103982 | A1* | 4/2015 | O'Conor | H04M 3/5116 379/45 |
| 2015/0312409 | A1* | 10/2015 | Czarnecki | H04M 3/42093 455/414.1 |
| 2015/0317892 | A1* | 11/2015 | Raj | G08B 21/18 340/6.1 |
| 2015/0335291 | A1* | 11/2015 | Saadi | G01C 22/006 702/141 |
| 2015/0350399 | A1* | 12/2015 | Feller | H04M 1/665 455/414.1 |
| 2016/0065735 | A1* | 3/2016 | Pott | H04M 3/42365 455/414.1 |
| 2016/0072943 | A1* | 3/2016 | Wang | H04M 1/663 455/401 |
| 2016/0241706 | A1* | 8/2016 | Ziemianska | H04M 3/436 |
| 2016/0277902 | A1* | 9/2016 | Wu | H04W 4/029 |
| 2016/0330319 | A1* | 11/2016 | Farrand | H04M 3/436 |
| 2017/0126889 | A1* | 5/2017 | Wang | H04M 3/436 |
| 2018/0077544 | A1* | 3/2018 | Guo | H04M 1/663 |

FOREIGN PATENT DOCUMENTS

| | | |
|---|---|---|
| CN | 106331340 A | 1/2017 |
| EP | 1931164 A1 | 6/2008 |
| JP | 2005101819 A | 4/2005 |
| WO | 2015101819 A1 | 7/2015 |

OTHER PUBLICATIONS

Extended European search report issued in corresponding European application No. 18175705.5 dated Oct. 10, 2018.

* cited by examiner

METHOD FOR CALL CONTROL AND RELATED PRODUCTS

CROSS-REFERENCE TO RELATED APPLICATION(S)

This application claims priority to Chinese Patent Application No. 201710475909.6, filed on Jun. 21, 2017, the disclosure of which is hereby incorporated by reference in its entirety.

TECHNICAL FIELD

The present disclosure relates to the field of mobile communication technology, and more particularly to a method for call control and related products.

BACKGROUND

With the popularization of mobile terminals such as smartphones, almost everyone has a mobile phone, and mobile phones have become an indispensable part of people's lives and work. Answering the phone is one of the most basic functions of a mobile phone, however, in many situations (for example, during a meeting), the user is not convenient to answer the phone. Existing do-not-disturb (DND) mode of an incoming call is implemented by setting a DND period in a system setting of the mobile phone, however, this method is inflexible and is poor in user experience.

SUMMARY

A method for call control and related products are provided, which can determine whether to reject an incoming call according to a user state, so as to improve user experience.

According to a first aspect of the disclosure, a method for call control is provided. The method includes the following.

In response to a mobile terminal receiving an incoming call request, a priority of the incoming call request is obtained. When the priority of the incoming call request is lower than a preset priority, whether a user is in a first state is determined. Based on a determination that the user is in the first state, the incoming call request is rejected.

According to a third aspect of the disclosure, there is provided a mobile terminal. The mobile terminal may include a memory and a processor coupled with the memory. The memory is configured to store programs; the processor is configured to invoke the programs stored in the memory to perform operations of the foregoing method for call control.

BRIEF DESCRIPTION OF THE DRAWINGS

To illustrate technical solutions embodied by the implementations of the present disclosure or by the related art more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1:
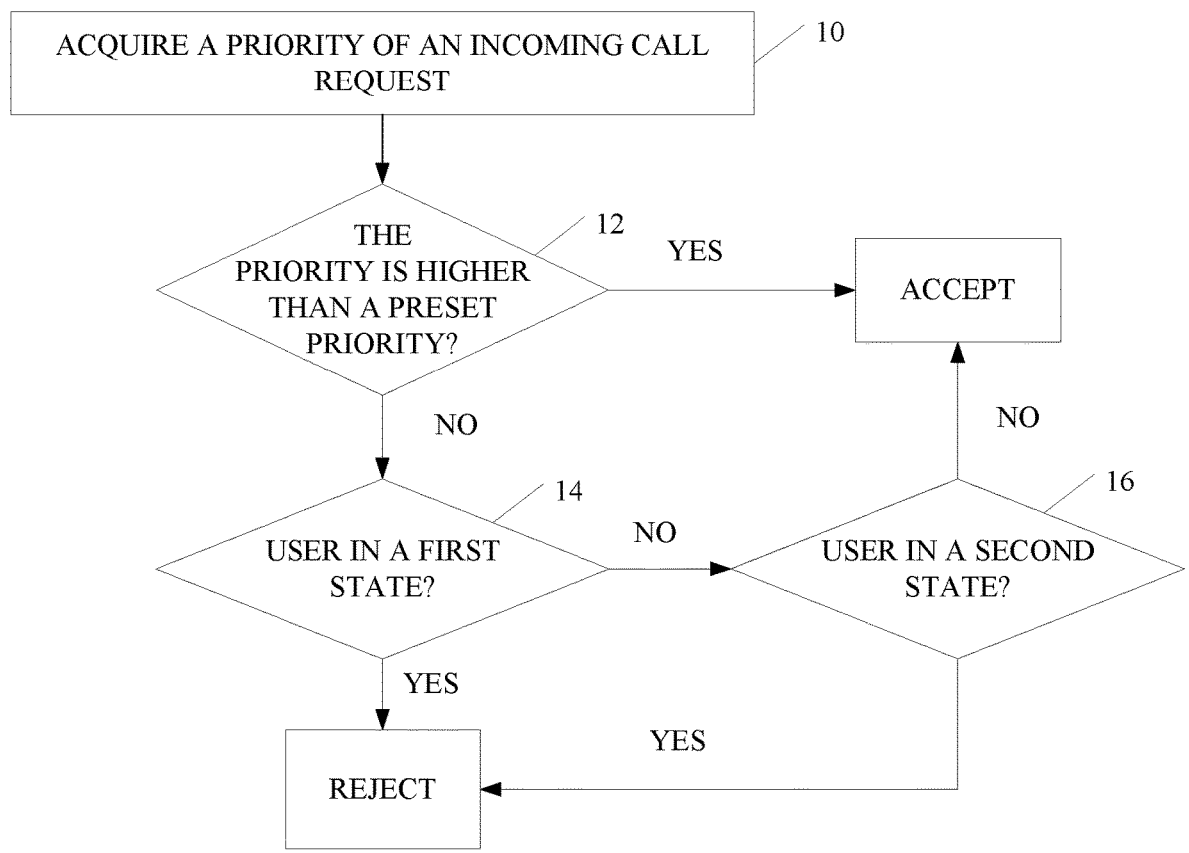
FIG. 1 is a schematic flow diagram illustrating a method for call control according to an implementation of the present disclosure.

Hereinafter, technical solutions embodied in the disclosure will be described in a clear and comprehensive manner in reference to the accompanying drawings intended for the implementations. It is evident that the implementations described herein constitute merely some rather than all of the implementations of the disclosure, and that those of ordinary skill in the art will be able to derive other implementations based on these implementations without making inventive efforts, which all such derived implementations shall all fall in the protection scope of the disclosure.

The terms "first", "second" used in the specification, the claims, and the accompanying drawings of the present disclosure are used for distinguishing between different objects rather than describing a particular order. The terms "include", "comprise", and "have" as well as variations thereof are intended to cover a non-exclusive inclusion. For example, a process, method, system, product, or apparatus including a series of operations or units is not limited to the listed operations or units, it can optionally include other operations or units that are not listed; alternatively, other operations or units inherent to the process, method, product, or device can be included either.

The term "embodiment" or "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

"Mobile terminal" in the implementations of the disclosure may include various handheld devices with wireless communication functions, on-board devices, wearable devices, computing devices, or other processing devices connected to a wireless modem, as well as various forms of user equipment (UE), mobile stations (Mobile Station, MS), terminal devices and the like. For convenience of description, the above-mentioned devices are collectively referred to as mobile terminals.

A method for call control is provided. In this method, a priority of an incoming call request is obtained in response to a mobile terminal receiving the incoming call request. Whether a user is in a first state is determined, when the priority of the incoming call request is lower than a preset priority. The incoming call request is rejected, based on a determination that the user is in the first state.

In one implementation, the first state includes a riding state. Whether the user is in the first state is determined as follows. A state of the user is inquired through a riding application. Determine that the user is in the riding state, when the riding application shows that the user is in the riding state. A speed of the mobile terminal is determined via a motion sensor and whether the speed falls into a riding speed range is determined, when the riding application shows that the user is not in the riding state. Determine that the user is in the riding state, based on a determination that the speed of the mobile terminal falls into the riding speed range.

In one implementation, the first state includes a running state. Whether the user is in the first state is determined as follows. A state of the user is acquired through a pedometer application. Determine that the user is in the running state, when the pedometer application shows that the user is in the running state. A speed of the mobile terminal is measured via a motion sensor and whether the speed falls into a running speed range is determined, when the pedometer application shows that the user is not in the running state. Determine that the user is in the running state, based on a determination that the speed of the mobile terminal falls into the running speed range.

In one implementation, the first state includes a climbing state. Whether the user is in the first state is determined as follows. A state of the user is inquired through a pedometer application. Determine that the user is in the first state, when the pedometer application shows that the user is in the first state. A speed and an altitude of the mobile terminal are measured via a motion sensor, determine whether the speed falls into a speed range and whether the altitude of the mobile terminal is changing and is greater than a preset height, when the pedometer application shows that the user is not in the first state. Determine that the user is in the first state, based on a determination that the speed of the mobile terminal falls into the speed range.

In one implementation, the method further includes the follows. Whether the user is in a second state is determined, based on a determination that the user is not in the first state. The incoming call request is accepted, based on a determination that the user is not in the second state.

In one implementation, the method further includes the follows. Whether the user is in a second state is determined, when the priority of the incoming call request is higher than the preset priority. The incoming call request is rejected, based on a determination that the user is in the second state.

In one implementation, the second state includes a conference state, and whether the user is in the second state can be achieved as follows. An environment of the user is captured through a camera. Determine that the user is in the conference state, when the camera shows that the user is in a conference place.

In one implementation, the second state includes a sleep state, and whether the user is in the second state can be achieved as follows. A state of the user is acquired through a sleep application. Determine that the user is in the sleep state, when the sleep application shows that the user is sleeping. Physiological parameters of the user are measured through a wearable device bound to the mobile terminal and whether each physiological parameter falls into a correspondingly preset physiological parameter range is determined, when the sleep application shows the user is not sleeping. Determine that the user is in the sleep state, based on a determination that each physiological parameter of the user falls into the correspondingly preset physiological parameter range.

A mobile terminal is further provided. The mobile terminal includes a memory configured to store programs and a processor coupled with the memory and configured to invoke the programs to: obtain a priority of an incoming call request in response to the mobile terminal receiving the incoming call request; determine whether a user is in a first state when the priority of the incoming call request is lower than a preset priority; reject the incoming call request based on a determination that the user is in the first state.

The mobile terminal further includes an application controller, and the processor is configured to inquire a state of the user via the application controller.

In one implementation, the first state includes a running state or a riding state. The processor configured to determine whether the user is in the first state is configured to: inquire a state of the user through the application controller; determine that the user is in the first state, when the application controller shows that the user is in the first state; a speed and an altitude of the mobile terminal are measured via a motion sensor, whether the speed falls into a speed range and whether the altitude of the mobile terminal is changing and is greater than a preset height are determined, when the application controller shows that the user is not in the first state; determine that the user is in the first state, based on a determination that the speed of the mobile terminal falls into the speed range.

In one implementation, the processor is further configured determine whether the user is in a second state, based on a determination that the user is not in the first state; accept the incoming call request, based on a determination that the user is not in the second state.

In one implementation, the processor is further configured to: determine whether the user is in a second state, when the priority of the incoming call request is higher than the preset priority; reject the incoming call request, based on a determination that the user is in the second state.

In one implementation, the processor is further configured to: determine whether the user is in a second state, based on a determination that the user is not in the first state; accept the incoming call request, based on a determination that the user is not in the second state.

In one implementation, the second state includes a conference state, the processor configured to determine whether the user is in the second state is configured to: capture an environment of the user through a camera; determine that the user is in the conference state, when the camera shows that the user is in a conference place.

In one implementation, the second state includes a sleep state, the processor configured to determine whether the user is in the second state is configured to: inquire a state of the user is through a sleep application; determine that the user is in the sleep state, when the sleep application shows that the user is sleeping; measure physiological parameters of the user through a wearable device bound to the mobile terminal and determine whether each physiological parameter falls into a correspondingly preset physiological parameter range, when the sleep application shows the user is not sleeping; determine that the user is in the sleep state, based on a determination that each physiological parameter of the user falls into the correspondingly preset physiological parameter range.

A method for call control is further provided. The method includes the follows. An incoming call request is received by a mobile terminal. A state of a user of the mobile terminal is acquired. Determine whether the user is in a first state or a second state. The incoming call request is accepted when the user is neither in the first state nor in the second state, the first state includes a sporting state and the second state includes a non-disturb state.

Whether the user is in the first state can be determined as follows. Determine whether the user is in the first state via at least one selected from a group consisting of an application installed on the mobile terminal, a motion sensor, and a wearable device bound to the mobile terminal.

Whether the user is in the second state can be determined as follows. Determine whether the user is in the first state via at least one selected from a group consisting of an application installed on the mobile terminal, a camera, a wearable device bound to the mobile terminal.

Implementations of the present disclosure will be detailed below with reference to the accompanying drawings.

Method Implementation 1

According to implementations of the disclosure, a method for call control is provided. In this method, a mobile terminal obtains a priority of an incoming call request when the incoming call request is received at the mobile terminal. Then the mobile terminal determines whether a user is in a first state, when the priority of the incoming call request is lower than a preset priority, and rejects the incoming call request when determining that the user is in the first state.

Specifically, as illustrated in FIG. 1, when an incoming call request is received, the mobile terminal acquires a priority of the incoming call request at block 10, then the mobile terminal determines whether the priority is higher than a preset priority at block 12, if yes, the incoming call will be accepted and otherwise, advance to block 14. At block 14, the mobile terminal determines whether the user is in a first state, if yes, the incoming call request will be rejected and otherwise, advance to block 16. At block 16, the mobile terminal determines whether the user is in a second state, if yes, the incoming call request will be rejected and otherwise, the incoming call request will be accepted. As can be seen, this method allows the mobile terminal to answer the phone when the priority of the incoming call request is higher than a preset priority or the user is in neither in the first state nor in the second state.

Figure 2:
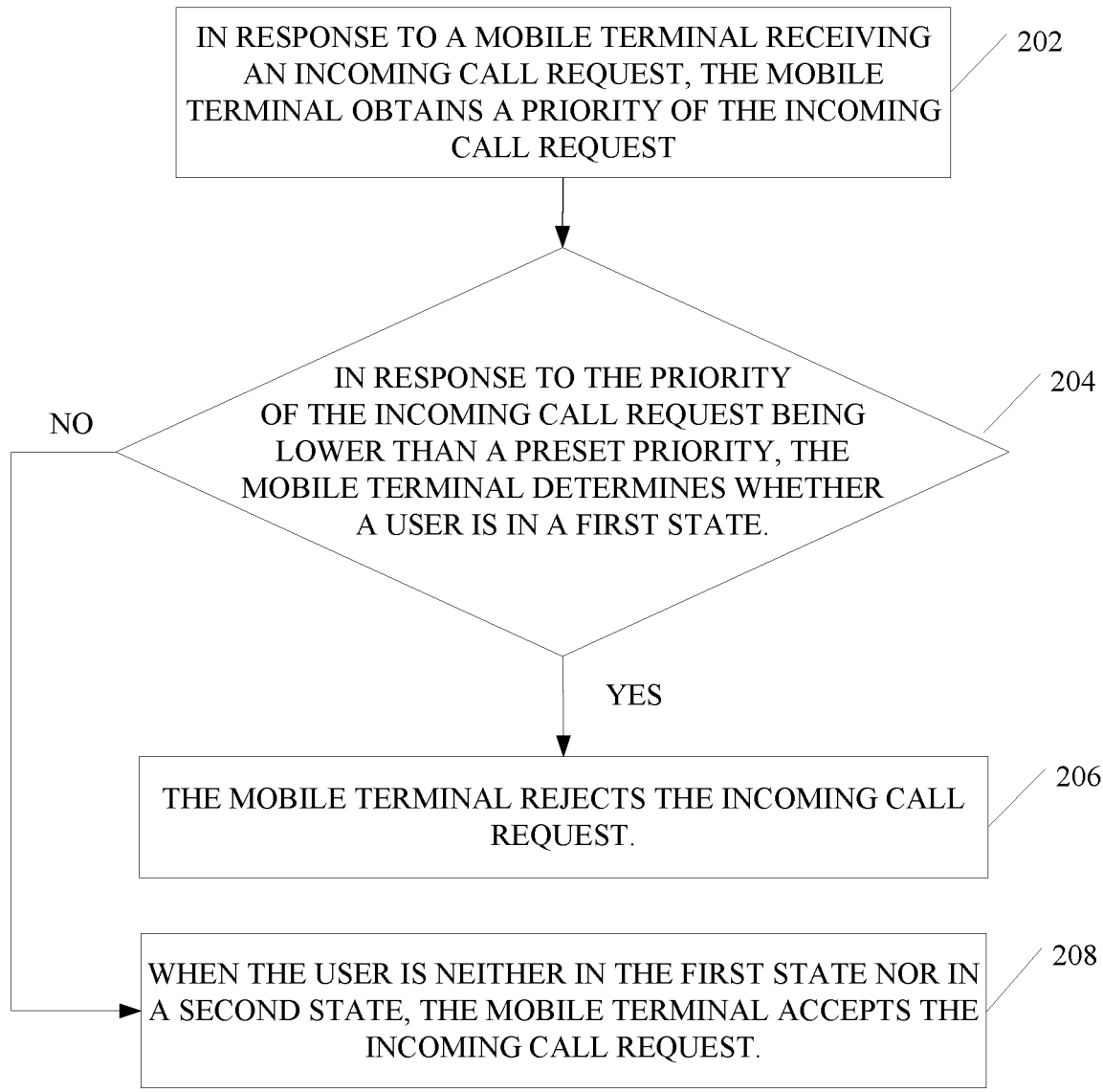
FIG. 2 is a schematic flow diagram illustrating a method for call control according to an implementation of the present disclosure.

FIG. 2 is a schematic flow diagram illustrating a method for call control according to an implementation of the present disclosure. As illustrated in FIG. 2, the method for processing the incoming call information begins at block 202.

At 202, when a mobile terminal receives an incoming call request, the mobile terminal obtains a priority of the incoming call request.

In this implementation of the present disclosure, the incoming call request is initiated by another terminal and is configured to establish a communication link with the mobile terminal for a voice call or a video call. The communication link may be established through an operator network (for example, 3G, 4G, 5G, and the like), or may be established through a WiFi network.

The priority of the incoming call request can be the priority of a call initiator corresponding to the incoming call request. The priority of the call initiator corresponding to the incoming call request is determined according to a historical call frequency, an accumulated duration of historical call between the call initiator and the mobile terminal, and whether a user identifier (ID) of the call initiator (for example, the user ID can be a phone number, a landline number, a QQ® number, a WeChat® number, and the like) corresponds to a contact in an address book. In general, the higher the historical communication frequency and the longer the accumulated duration of historical call between the call initiator corresponding to the incoming call request and the mobile terminal, the higher the priority of the incoming call request. A higher priority of the incoming call request indicates that a user pays more attention to the incoming call request. In general, an incoming call request of a frequent contact has a higher priority and an incoming call request of a stranger (that is, a phone number that calls the mobile terminal for the first time) has a lower priority.

At 204, when the priority of the incoming call request is lower than a preset priority, the mobile terminal determines whether the user is in a first state. When the user is in the first state, advance to operations at 206, otherwise, advance to operations at 208.

In implementations of the present disclosure, the first state may be an outdoor-activity state or sporting state, such as a running state, a riding state, a climbing state (such as climbing a mountain), or the like, which will be detailed below respectively. The mobile terminal can acquire the state of the user from applications installed on the mobile terminal via an application controller for example.

Running State

The mobile terminal can inquire a state of the user through a pedometer application (for example, Codoon, ledongli, etc.) installed on the mobile terminal. When the pedometer application shows that the user is currently in the running state, the mobile terminal determines that the user is in the running state. The mobile terminal can determine whether the user is in the running state via a motion sensor (for example, a triaxial gyroscope, a triaxial acceleration sensor, etc.), specifically, by detecting a speed and a swing amplitude of the mobile terminal via the motion sensor. When the speed of the mobile terminal falls into a running speed range and the swing amplitude of the mobile terminal falls into a swing amplitude range, the mobile terminal can determine that the user carrying the mobile terminal is in the running state. A smart wearable device bound to the mobile terminal ("smart wearable device" for short in the following) can also be used to determine whether the user is in the running state. When the smart wearable device detects that the user is in the running state, it will send a notification message to the mobile terminal to notify that the user is currently in the running state.

As one implementation, the first state includes a running state. The mobile terminal determines whether the user is in the first state as follows.

The mobile terminal inquires a state of a user through a pedometer application.

When the pedometer application shows that the user is in the running state, the user is determined to be in the running state.

When the pedometer application shows that the user is not in the running state, the mobile terminal measures a speed of the mobile terminal via a motion sensor to see if the speed is in a running speed range.

When the speed of the mobile terminal is in the running speed range, the user is determined to be in the running state.

The pedometer application (for example, Codoon, ledongli and the like) can accurately record the current number of steps of the user as well as record whether the user is running currently. In the event that the user does not use a pedometer application, as long as the user carries the mobile terminal, the mobile terminal can detect the speed and a swing amplitude of the mobile terminal through a motion sensor (for example, a triaxial gyroscope, a triaxial acceleration sensor, etc.). When the speed of the mobile terminal conforms to a spmoeed range corresponding to the running state (that is, the running speed range) and the swing amplitude of the mobile terminal falls into a swing amplitude range, the user carrying the mobile terminal will be determined to be in the running state.

Riding State

The mobile terminal can inquire a state of the user with aid of a riding application (for example, Apps such as Mobike™, Ofo™ and the like) installed on the mobile terminal. When the riding application shows that the user is currently in the riding state, the mobile terminal can determine that the user is in the riding state. A motion sensor (for example, a triaxial gyroscope, a triaxial acceleration sensor, etc.) can be used to achieve the judgment of whether the user state is in the riding state; specifically, the motion sensor can be used to detect a speed of the mobile terminal. When the speed of the mobile terminal falls into a speed range corresponding to the riding state, the mobile terminal determines that the user carrying the mobile terminal is in the riding state. The mobile terminal can also determine whether the user is in the riding state through a smart wearable device bound to the mobile terminal (hereinafter, "smart wearable device" for short). When the smart wearable device detects that the user is in the riding state, it will send a notification message to the mobile terminal to notify that the user is currently in the riding state.

As another implementation, the first state includes a riding state. The mobile terminal determines whether the user is in the first state as follows.

The mobile terminal inquires a state of the user through a riding application.

When the riding application shows that the user is in the riding state, the mobile terminal determines that the user is in the riding state.

When the riding application shows that the user is not in the riding state, the mobile terminal measures a speed of the mobile terminal via a motion sensor to see if the speed falls into a riding speed range.

When the speed of the mobile terminal falls into the riding speed range, the mobile terminal determines that the user is in the riding state.

The riding application (such as Mobike™, Ofo™ and so on) can accurately record whether the user is riding. In the event that the user rides a bicycle through the riding application, the mobile terminal can directly determine that the user is in the riding state through the riding application. On the other hand, if the user does not use the riding application, the speed of the mobile terminal can be detected via a motion sensor (for example, a triaxial gyroscope, a triaxial acceleration sensor, etc.). When the speed of the mobile terminal conforms to the speed range corresponding to the riding state, the user carrying the mobile terminal can be determined to be in the riding state; when the speed of the mobile terminal does not conform to the speed range corresponding to the riding state, the user carrying the mobile terminal can be determined to be not in the riding state.

Climbing State

Similarly, the mobile terminal can determine whether the user is in a climbing state through a pedometer application (for example, Apps such as Codoon, ledongli and the like) installed on the mobile terminal. When the pedometer application shows that the user is currently in the climbing state, the mobile terminal can determine that the user is in the climbing state. The mobile terminal can judge whether the user is in the climbing state by detecting a speed and an altitude of the mobile terminal via a motion sensor (for example, a gravity sensor, a triaxial gyroscope, a triaxial acceleration sensor, etc.). When the speed of the mobile terminal falls into a climbing speed range and the altitude of the mobile terminal is changing and is greater than a preset height, the mobile terminal can determine that the user carrying the mobile terminal is in the climbing state. The mobile terminal can also determine whether the user is in the climbing state through a smart wearable device bound to the mobile terminal (hereinafter, "smart wearable device" for short). When the smart wearable device detects that the user is in the climbing state, it will send a notification message to the mobile terminal to notify that the user is currently in the climbing state.

At 206, the mobile terminal rejects the incoming call request.

When the mobile terminal determines that the user is in the first state (e.g., the running state, the riding state, the climbing state, and the like), the mobile terminal rejects the incoming call request, that is, the mobile terminal rejects to answer the phone. By means of the implementations of the present disclosure, the mobile terminal can reject a call when the mobile terminal is in a specific preset state, which can prevent an incoming call with a lower priority from disturbing and affecting the user, thereby improving user experience.

As one implementation, the mobile terminal may further perform the follows after the incoming call request is rejected at 206.

At (11), the mobile terminal receives a missed call alert message, which is configured to remind the user of a missed call(s) and contains the user identifier (ID) of the call initiator corresponding to the missed call.

With implementation of the operation at (11), it is possible to remind the user of a missed call after the mobile terminal rejects the incoming call request, and this can help the user to know the details of the missed call.

As another implementation, the mobile terminal can further perform the follows after the operation at (11).

At (12), when a call back request against the missed call corresponding to the user identifier of the call initiator is received, the mobile terminal raises a priority of the call initiator corresponding to the missed call.

With implementation of the operation at (12), if the user calls back the missed call, it indicates that the user values the call initiator corresponding to the missed call and therefore, the priority of the call initiator corresponding to the missed call can be raised.

At 208, when the user is neither in the first state nor in a second state, the mobile terminal accepts the incoming call request.

In implementations of the present disclosure, both of the first state and the second state are a state inconvenient for the user to answer the phone. When the user is neither in the first state nor in the second state, that is, the user is in a state convenient for the user to answer the phone, the mobile terminal will accept the incoming call request and answer the phone normally. The second state refers to a scene where the user does not want to be disturbed, such as a conference state, a sleep state, or the like.

With help of the method illustrated in FIG. 1 and FIG. 2, when the user is in the first state (e.g., a running state, a riding state, and the like), the incoming call with a lower priority can be rejected so as to prevent the user from being disturbed and affected, thereby improving user experience.

Method Implementation 2

The difference between this method and the above method lies in that, when the priority of the incoming call request is higher than a preset priority, the mobile terminal still has to check the state of the user to see whether he or she is convenient to answer the phone.

Figure 3:
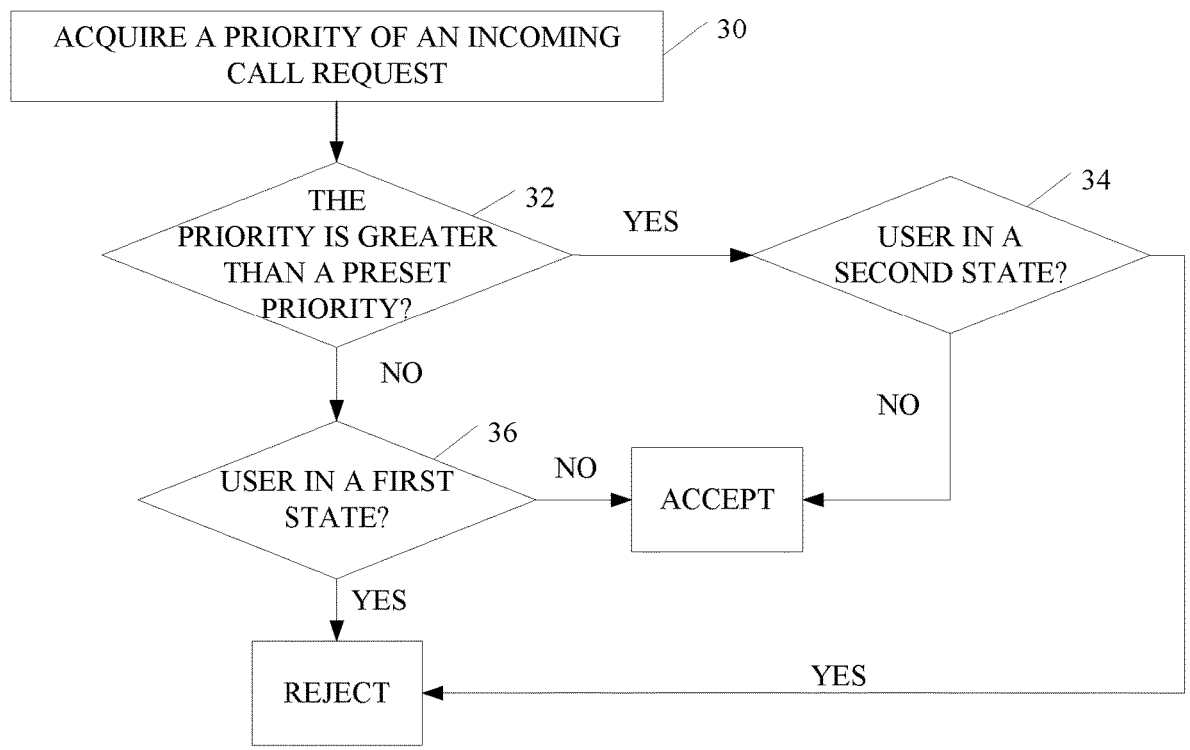
FIG. 3 is a schematic flow diagram illustrating another method for call control according to an implementation of the present disclosure.

As illustrated in FIG. 3, when an incoming call request is received, the mobile terminal acquires a priority of the incoming call request at block 30, then the mobile terminal determines whether the priority is higher than a preset priority at block 32, if yes, advance to block 34; otherwise, advance to block 36. At block 34, the mobile terminal determines whether the user is in a second state, if yes, the incoming call request will be rejected; otherwise, the incoming call request will be rejected. Similarly, at block 36, the mobile terminal determines whether the user is in a first state, if yes, the incoming call request will be rejected and otherwise, the incoming call request will be rejected. In short, the incoming call request will be accepted when the priority thereof is higher than the preset priority and the user is not in the second state, or the priority thereof is lower than the preset priority and the user is not in the first state.

Figure 4:
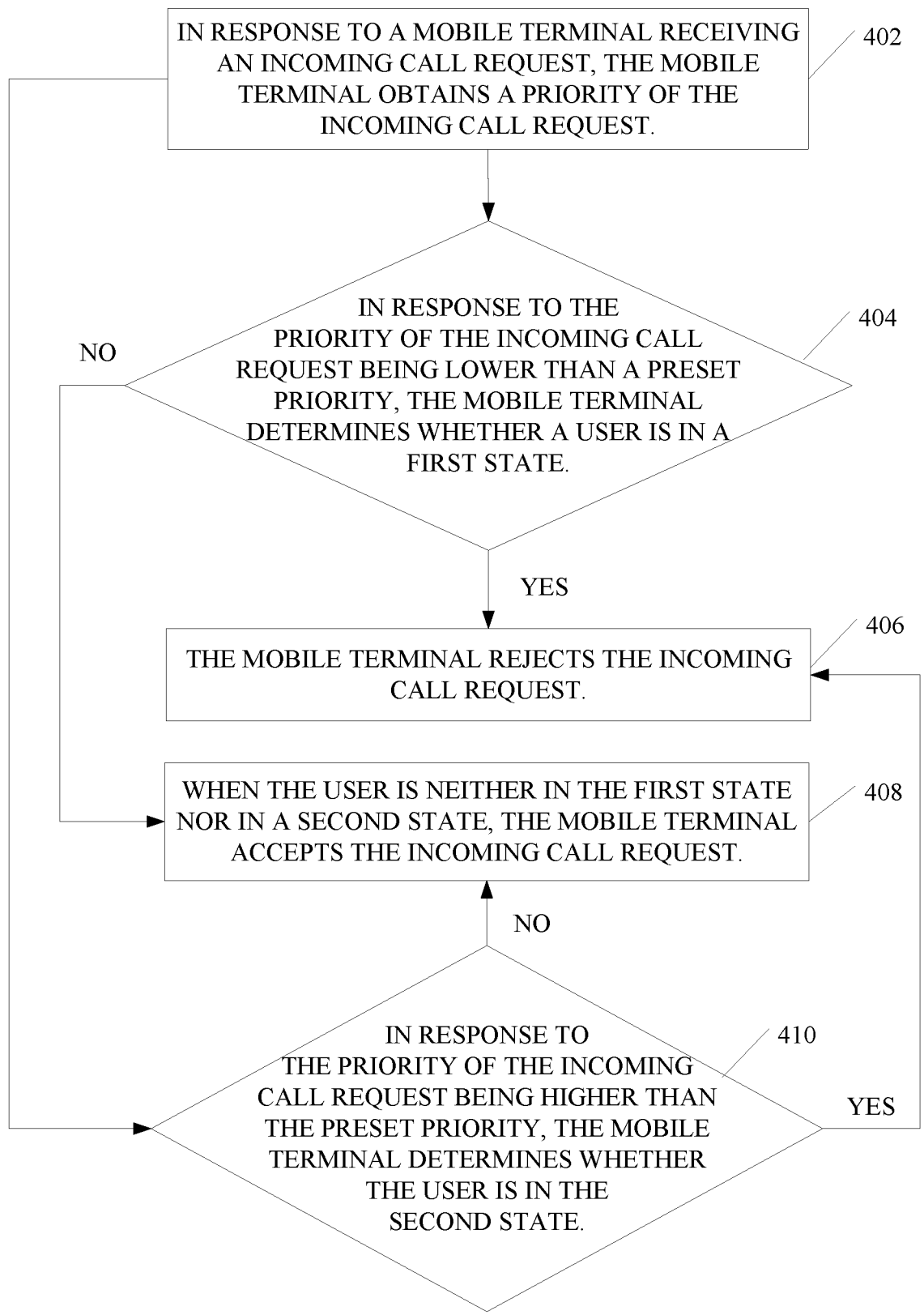
FIG. 4 is a schematic flow diagram illustrating a method for call control according to an implementation of the present disclosure.

Specifically, FIG. 4 is a schematic flow diagram illustrating another method for call control according to an implementation of the present disclosure. As illustrated in FIG. 4, the method for call control may include the following.

At 402, when a mobile terminal receives an incoming call request, the mobile terminal obtains a priority of the incoming call request.

At 404, when the priority of the incoming call request is lower than a preset priority, the mobile terminal determines whether a user is in a first state. When the user is in the first state, advance to the operation at 406; otherwise, when the user is not in the first state, advance to the operation at 408.

At 406, the mobile terminal rejects the incoming call request.

At 408, when the user is neither in the first state nor in a second state, the mobile terminal accepts the incoming call request.

At 410, when the priority of the incoming call request is higher than the preset priority, the mobile terminal determines whether the user is in the second state. When the user is in the second state, advance to operation 406; otherwise, when the user is not in the second state, advance to operation 408.

The second state may be a scene that the user does not want to be disturbed, such as a conference state, a sleep state, or the like. Therefore, even if the priority of the incoming call request is higher than the preset priority, the mobile terminal will still reject the incoming call request if the user is in the second state. The mobile terminal can reject the incoming call when the user does not want to be disturbed so as to prevent the user from being affected and improve user experience.

As one implementation, the second state includes a conference state and the mobile terminal determines whether the user is in the second state as follows.

Conference State

The mobile terminal captures an environment of the user through a camera.

When the camera shows that the user is in a conference place, the mobile terminal determines that the user is in the conference state.

Therefore, the mobile terminal can determine whether the user is in the conference state with aid of the camera. When the camera captures a scene where at least two people around a table, it can be assumed that the user is in the conference state. Further, the mobile terminal may also determine whether the user is in the conference state through a microphone. When the camera captures a scene where at least two people around a table, the microphone will be initiated for recording. Contents recorded will then be analyzed to see if there is any preset meeting keyword contained, if yes, it can be assumed that the user is in the conference state.

Sleep State

As one implementation, the second state includes a sleep state and the mobile terminal determines whether the user is in the second state as follows.

The mobile terminal inquires a state of the user through a sleep application.

When the sleep application shows that the user is in sleeping, the mobile terminal determines that the user is in the sleep state.

On the other hand, when the sleep application shows the user is not sleeping, the mobile terminal measures physiological parameters of the user through a wearable device bound to the mobile terminal to see whether each physiological parameter is in a correspondingly preset physiological parameter range.

When each physiological parameter of the user falls into the correspondingly preset physiological parameter range, the mobile terminal determines that the user is in the sleep state.

In this implementation, the mobile terminal can determine whether the user is in the sleep state through the sleep application. The sleep application can comprehensively determine whether the user is in the sleep state by monitoring physiological parameters of the user such as a heart rate, a blood pressure, a body temperature, and the like. The mobile terminal can also obtain various physiological parameters of the user (e.g., physiological parameters such as a heart rate, a blood pressure, a body temperature, and so on) through a wearable device bound to the mobile terminal. When detecting that each physiological parameter of the user falls into the correspondingly preset physiological parameter range, the mobile terminal determines that the user is in the sleep state.

As one implementation, the mobile terminal may further perform the follows after the incoming call request is rejected at 406.

At (21), the mobile terminal receives a missed call alert message, which is configured to remind the user of a missed call(s) and contains the user identifier (ID) of the call initiator corresponding to the missed call.

With implementation of the operation at (21), it is possible to remind the user of a missed call after the mobile terminal rejects the incoming call request, and this can help the user to know the details of the missed call.

As another implementation, the mobile terminal can further perform the follows after the operation at (21) is performed.

At (22), when a call back request against the missed call corresponding to the user identifier of the call initiator is received, the mobile terminal raises a priority of the call initiator corresponding to the missed call.

With implementation of the operation at (22), if the user calls back the missed call, it indicates that the user values the call initiator corresponding to the missed call and therefore, the priority of the call initiator corresponding to the missed call can be raised.

For details of the operations at 402-410, reference can be made to the operations at 202-208 described in conjunction with FIG. 2, and it will not be repeated here.

According to the method illustrated in FIG. 4, when the user is in the second state (e.g., the conference state, the sleep state, and so on), even if the incoming call request has a high priority, the incoming call request can still be rejected. The mobile terminal can reject the incoming call in scenarios where the user does not want to be disturbed at all, thus preventing the incoming call from affecting the user and improving user experience.

Method Implementation 3

Figure 5:
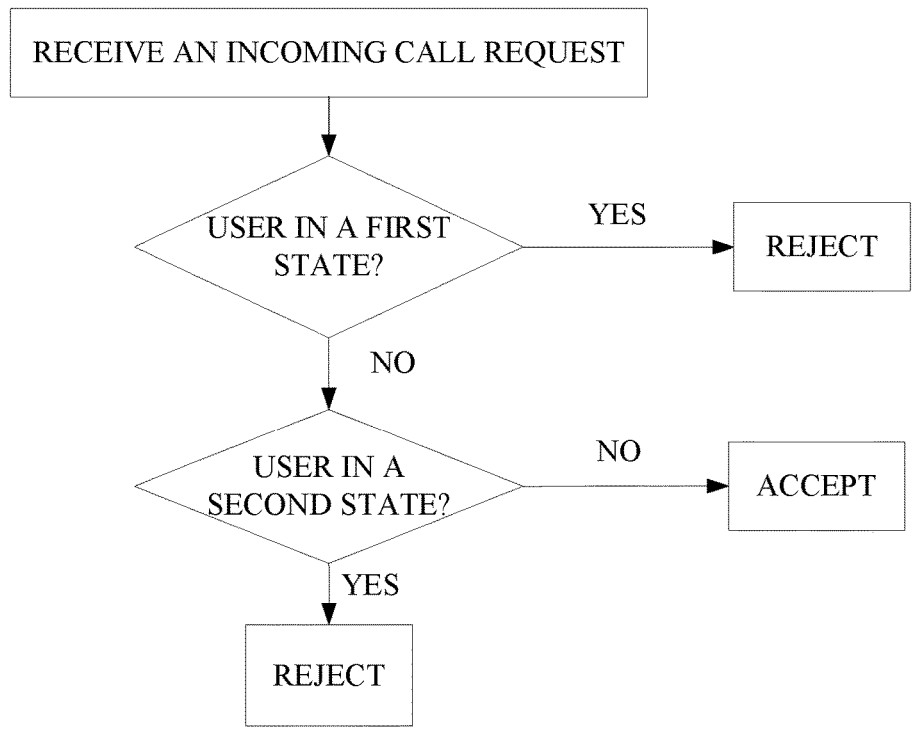
FIG. 5 is a schematic flow diagram illustrating still another method for call control according to an implementation of the present disclosure.

In this method, a different approach different than the foregoing methods is provided, in which the mobile terminal can inquire the state of the user directly without obtaining the priority of the incoming call request at the being. Specifically, as illustrated in FIG. 5, when the user is in the first state or in the second state, the incoming call will be rejected, that is, the incoming call will be accepted only when the user is neither in the first state nor in the second state. For details, please refer to the foregoing description, and it will not be repeated here to avoid redundancy. Thus, in this implementation, there is no need for the mobile terminal to determine the priority of the incoming call request at all. In contrast, the mobile terminal will determine whether to accept the incoming call request totally based on the state of the user, in this way, it is possible to improve the speed of a processor(s) of the mobile terminal and accordingly reduce the response time to the incoming call request.

With the understanding that the principles of this disclosure apply more generally to many scenarios, those skilled in the art will appreciate that the determining of the state of the user is not particularly restricted. For instance, the mobile terminal can first determine whether the user is in the first state and then, if necessary, further determine whether the user is in the second state, alternatively, the mobile terminal can first determine whether the user is in the second state and thereafter, in necessary, determine whether the user is in the first state. These solutions all contribute to the advantages of this disclosure.

The foregoing technical solutions of the implementations of the disclosure are mainly described from the viewpoint of execution of the method. It can be understood, however, that for achievement of the above functions, the mobile terminal may be structured to have hardware structures and/or software modules corresponding to the respective functions. Those skilled in the art should readily recognize that, in combination with the exemplary units and scheme steps or operations described in the implementations disclosed herein, the present disclosure can be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the present disclosure.

In implementations of the disclosure, functional units may be divided for the mobile terminal in accordance with the foregoing method examples. For example, functional units may be divided according to corresponding functions, and two or more functions may be integrated into one processing unit. The above-mentioned integrated unit can be implemented in the form of hardware or software functional units. It should be noted that the division of units in the implementations of the present disclosure is schematic and is merely a logical function division; there may be other division manners in actual implementation.

Figure 6:
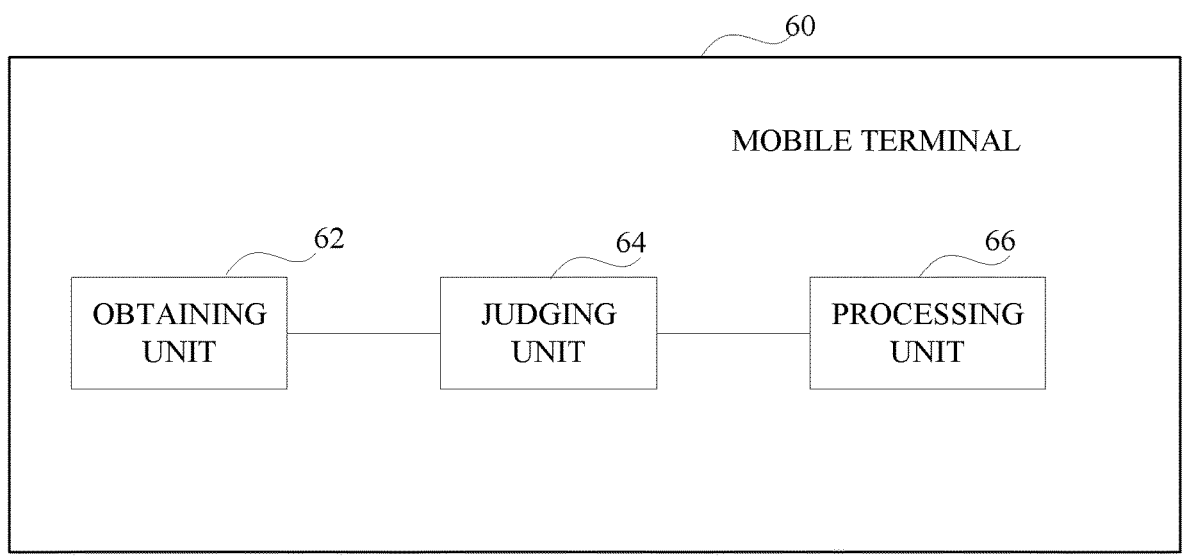
FIG. 6 is a schematic structural diagram illustrating a mobile terminal according to an implementation of the present disclosure.

FIG. 6 is a schematic structural diagram illustrating a mobile terminal according to an implementation of the present disclosure. As illustrated in FIG. 6, a mobile terminal 60 includes an obtaining unit 62, a judging unit 64, and a processing unit 66.

The obtaining unit 62 is configured to obtain a priority of an incoming call request when the mobile terminal receives the incoming call request.

The judging unit 64 is configured to judge whether a user is in a first state when the priority of the incoming call request is lower than a preset priority.

The processing unit 66 is configured to reject the incoming call request when the judging unit 64 judges that the user is in the first state.

As one implementation, the first state includes a riding state and the judging unit 64 may include a first judging subunit, a first determining subunit, a second judging subunit, and a second determining subunit.

The first judging subunit is configured to judge whether the user is in the riding state through a riding application.

The first determining subunit is configured to determine that the user is in the riding state when the first judging subunit judges that the user is in the riding state.

The second judging subunit is configured to judge whether a speed of the mobile terminal falls into a riding speed by measuring the speed via a motion sensor when the first judging subunit judges that the user is not in the riding state.

The second determining subunit is configured to determine that the user is in the riding state when the second judging subunit judges that the speed of the mobile terminal is in the riding speed range.

As one implementation, the first state includes a running state, and the judging unit 64 may include a third judging subunit, a third determining subunit, a fourth judging subunit, and a fourth determining subunit.

The third judging subunit is configured to judge whether the user is in the running state through a pedometer application.

The third determining subunit is configured to determine that the user is in the running state when the third judging subunit judges that the user is in the running state.

The fourth judging subunit is configured to judge whether a speed of the mobile terminal falls into in a running speed range by measuring the speed via a motion sensor when the third judging subunit judges that the user is not in the running state.

The fourth determining subunit is configured to determine that the user is in the running state when the fourth judging subunit judges that the speed of the mobile terminal is in the running speed range.

As one implementation, the judging unit 64 is further configured to judge whether the user is in a second state when the priority of the incoming call request is higher than the preset priority.

The processing unit 66 is further configured to reject the incoming call request when the judging unit 64 judges that the user is in the second state.

As one implementation, the second state includes a conference state, and the judging unit 64 may include a fifth judging subunit and a fifth determining subunit.

The fifth judging subunit is configured to judge whether the user is in a conference place through a camera.

The fifth determining subunit is configured to determine that the user is in the conference state when the fifth judging subunit judges that the user is in the conference place.

As another implementation, the second state includes a sleep state, and the judging unit 64 may include a sixth judging subunit, a sixth determining subunit, a seventh judging subunit, and a seventh determining subunit.

The sixth judging subunit is configured to judge whether the user is in the sleep state through a sleep application.

The sixth determining subunit is configured to determine that the user is in the sleep state when the sixth judging subunit judges that the user is in the sleep state.

The seventh judging subunit is configured to judge whether each physiological parameter of the user falls into a corresponding preset physiological parameter range through a wearable device bound to the mobile terminal when the sixth judging subunit judges that the user is not in the sleep state.

The seventh determining subunit is configured to determine that the user is in the sleep state when the seventh judging subunit judges that each physiological parameter of the user falls into the correspondingly preset physiological parameter range.

The mobile terminal illustrated in FIG. 6 allows for the mobile terminal to reject the incoming call with a lower priority when the user is in the first state (such as a running state, a riding state and so on), to prevent the incoming call from disturbing and affecting the user, thereby improving user experience.

Figure 7:
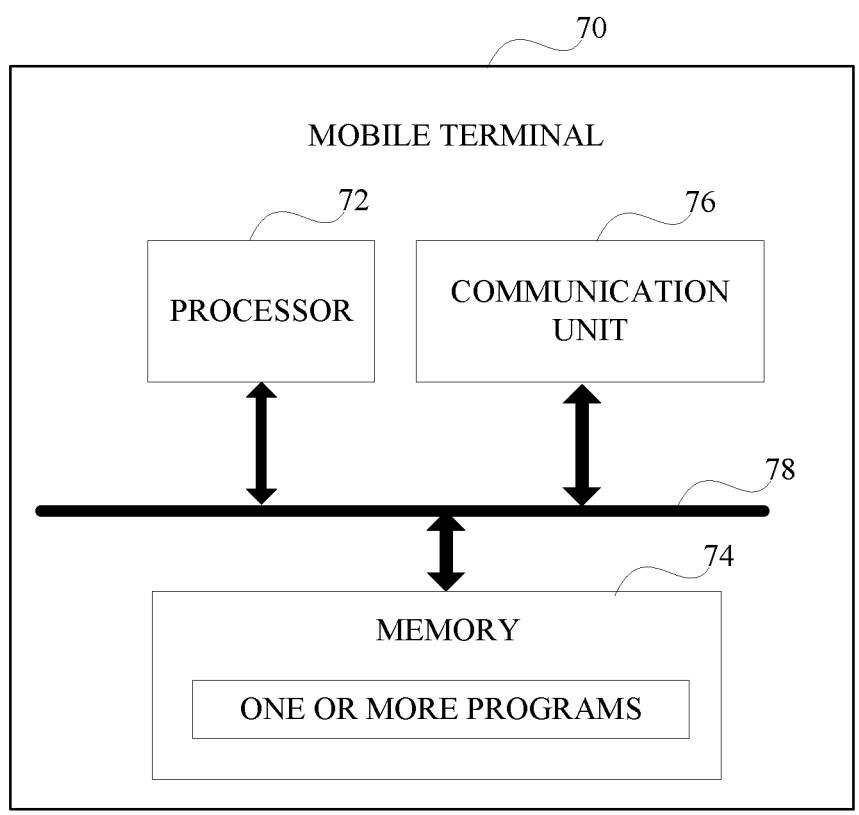
FIG. 7 is a schematic structural diagram illustrating another mobile terminal according to an implementation of the present disclosure.

FIG. 7 is a schematic structural diagram illustrating another mobile terminal according to an implementation of the present disclosure. As illustrated in FIG. 7, a mobile terminal 70 includes one or more processors 72, a memory 74, a communication unit 76, and one or more programs. The one or more programs are stored in the memory 74 and include instructions that, when executed by the one or more processors 72, are operable with the one or more processors 72 to perform the method illustrated in FIG. 1-FIG. 5. The one or more processors 72, the memory 74, and the communication unit 76 are coupled via a communication bus 78.

The communication unit 76 is configured to establish a communication channel, such that the mobile terminal 70 can connect to a communication peer end or a base station and further exchange data with the communication peer end or the base station through the communication channel. The communication unit 76 may include wireless communication modules and wired communication modules. Examples of the wireless communication module include a wireless local area network (Wireless LAN for short) module, a Bluetooth module, a near field communication (NFC), a baseband module and the like. Examples of the wired communication modules include an Ethernet, a universal serial bus (USB), a lightning interface and the like. The mobile terminal 70 can be configured such that components thereof can communicate with a communication peer end or a base station and support direct memory access with aid of the communication unit 76.

The processor 72 may include one central processing unit (CPU) only, or, the processor may be a combination of a CPU, a digital signal processor (DSP), a graphics processing unit (GPU), and control chips of a communication unit (such as baseband chips). In implementations of the present disclosure, the CPU may be a single operation core or multiple operation cores.

According to the mobile terminal illustrated in FIG. 7, when the user is in the first state (for example, a running state, a riding state, and the like), the mobile terminal may reject the incoming call with a lower priority, preventing the incoming call with the lower priority from disturbing and affecting the user, thereby improving user experience.

Figure 8:
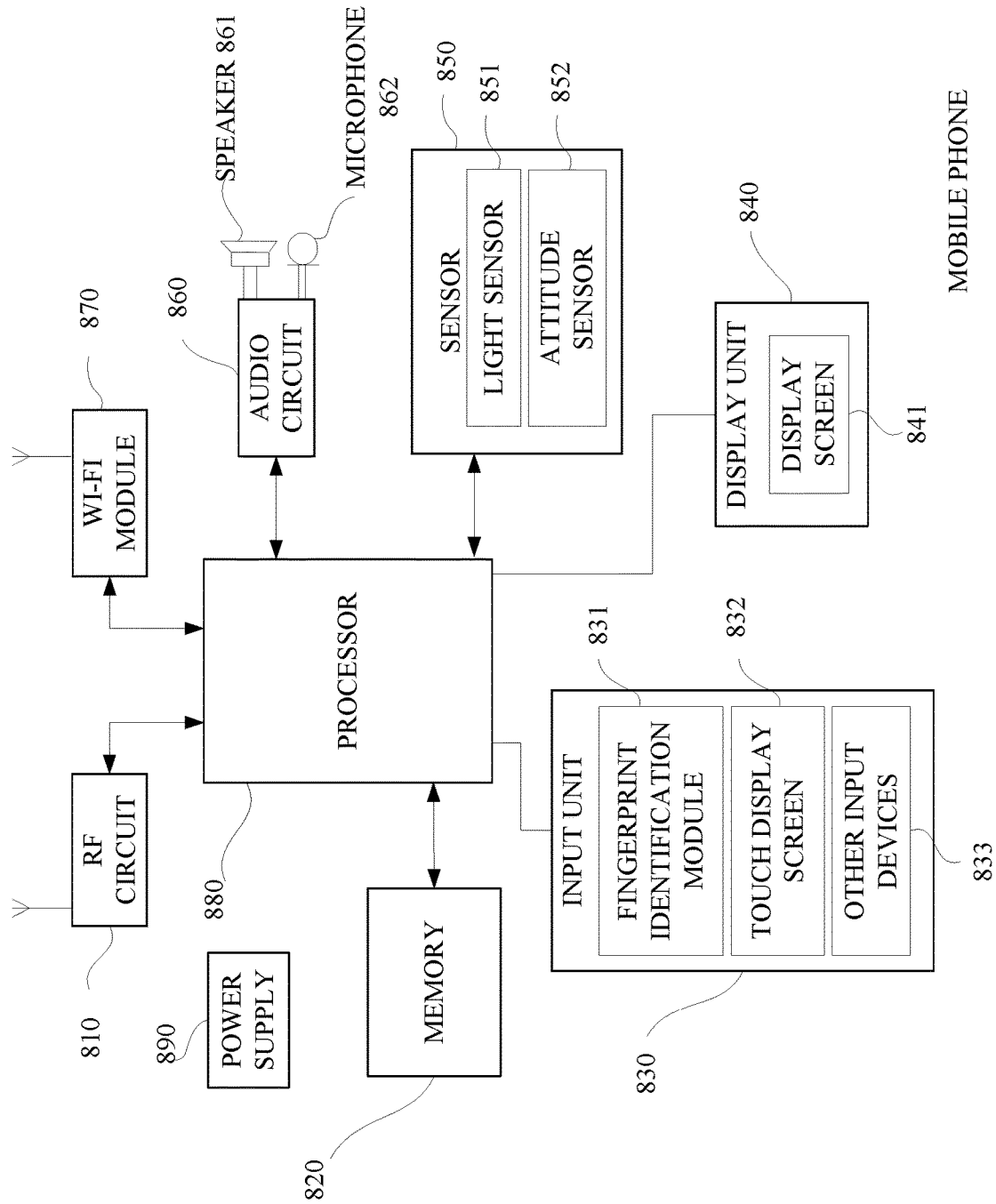
FIG. 8 is a schematic structural diagram illustrating still another mobile terminal according to an implementation of the present disclosure.

According to an implementation of the present disclosure, another mobile terminal is provided. As illustrated in FIG. 8, for the convenience of description, only parts related to the implementations of the present disclosure are illustrated. For technical details not provided, reference may be made to the method implementations of the present disclosure. The mobile terminal referred to herein may be any terminal device such as a mobile phone, a tablet computer, a personal digital assistant (PDA), a point of sale terminal (POS), an on-board computer, and the like. The following describes the mobile phone as an example of the mobile terminal.

FIG. 8 is a block diagram of a part of a structure of a mobile phone related to a mobile terminal according to the implementation of the present disclosure. As illustrated in FIG. 8, the mobile phone includes a radio frequency (RF) circuit 810, a memory 820, an input unit 830, a display unit 840, a sensor 850, an audio circuit 860, a wireless fidelity (Wi-Fi) module 870, a processor 880, a power supply 890 and other components. Those skilled in the art can understand that the structure of the mobile phone illustrated in FIG. 8 does not constitute any limitation on a mobile phone. The mobile phone configured to implement technical solutions of the disclosure may include even more or fewer components than illustrated, or may combine certain components or different components.

In the following, various components of the mobile phone will be described in detail with reference to FIG. 8.

The RF circuit 810 is configured to transmit or receive information. Generally, the RF circuit 810 includes but is not limited to an antenna, at least one amplifier, a transceiver, a coupler, a low noise amplifier (LNA), a duplexer, and the like. In addition, the RF circuit 810 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 820 is configured to store software programs and modules, and the processor 880 is configured to execute various function applications and data processing of the mobile phone by running the software programs and the modules stored in the memory 820. The memory 820 mainly includes a program storing region and a data storing region. The program storing region may store an operating system, application programs required for at least one function and so on. The data storing region may store data (such as usage parameters of an application) created according to use of the mobile phone, and so on. In addition, the memory 820 may include a high-speed random access memory (RAM), and may further include a non-transitory memory such as at least one disk storage device, a flash device, or other non-transitory solid storage devices.

The input unit 830 is configured to receive input digital or character information and generate key signal input associated with user setting and function control of the mobile phone. In one implementation, the input unit 830 may include a fingerprint identification module 831, a touch display screen 832, and other input devices 833. The fingerprint identification module 831 can collect fingerprint data of the user. In addition to the fingerprint identification module 831, the input unit 830 may further include other input devices 833. In one implementation, the other input devices 833 may include, but not limited to, one or more of a touch screen, a physical key, a function key (such as a volume control key, a switch key, etc.), a trackball, a mouse, a joystick, and the like.

The display unit 840 is configured to display information input by the user or information provided for the user or various menus of the mobile phone. The display unit 840 may include a display screen 841. In at least one implementation, the display screen 841 may be in the form of a liquid crystal display (LCD), an organic light-emitting diode (OLED) and so on. Although the fingerprint identification module 831 and the display screen 841 are illustrated as two separate components in FIG. 8 to realize the input and output functions of the mobile phone, in some implementations, the fingerprint identification module 831 may be integrated with the display screen 841 to implement the input and output functions of the mobile phone.

The mobile phone may also include at least one sensor 850, such as a light sensor 851, an attitude sensor 852, and other sensors. In one implementation, the light sensor 851 may include an ambient light sensor and a proximity sensor, among which the ambient light sensor may adjust the brightness of the display screen 841 according to ambient lights, and the proximity sensor may turn off the display screen 841 and/or backlight when the mobile phone reaches nearby the ear. The attitude sensor 852 may include a motion sensor. As a kind of a motion sensor, an accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyroscope, a barometer, a hygrometer, a thermometer, and an infrared sensor and other sensors, and it will not be repeated herein.

The audio circuit 860, a speaker 861, a microphone 862 may provide an audio interface between the user and the mobile phone. The audio circuit 860 may convert the received audio data into electrical signals and transfer the electrical signals to the speaker 861; thereafter the speaker 861 converts the electrical signals into sound signals to output. On the other hand, the microphone 862 converts the received sound signals into electrical signals, which will be received and converted into audio data by the audio circuit 860 to output. The audio data is then processed and transmitted by the processor 880 via an RF circuit 810 to another mobile phone for example, or, the audio data is output to the memory 820 for further processing.

Wi-Fi belongs to a short-range wireless transmission technology. With aid of the Wi-Fi module 870, the mobile phone may assist the user in E-mail receiving and sending, webpage browsing, access to streaming media, and the like. Wi-Fi provides users with wireless broadband Internet access. Although the Wi-Fi module 870 is illustrated in FIG. 8, it should be understood that the Wi-Fi module 870 is not essential to the mobile phone and can be omitted according to actual needs without departing from the essential nature of the present disclosure.

The processor 880 is a control center of the mobile phone. It uses various interfaces and lines to connect various parts of the whole mobile phone, runs or executes software programs and/or modules stored in the memory 820, and calls data stored in the memory 820 to perform various functions of the mobile phone and process data, thereby monitoring the mobile phone. In at least one implementation, the processor 880 may include one or more processing units; for example, the processor 880 may integrate an application processor and a modem processor, wherein the application processor mainly handles the operating system, the user interface, the application programs, and so on, and the modem processor mainly processes wireless communication. It will be appreciated that the above-mentioned modem processor may not be integrated into the processor 880.

The mobile phone also includes the power supply 890 (e.g., a battery) that supplies power to various components. For instance, the power supply 890 may be logically connected to the processor 880 via a power management system to enable management of charging, discharging, and power consumption through the power management system.

Although not illustrated, the mobile phone may include a camera, a Bluetooth module, etc., and the disclosure will not elaborate herein.

Implementations of the present disclosure also provide a computer readable storage medium. The computer readable storage medium may store computer programs which, when executed, can be operable with a computer to accomplish all or part of the operations of any of methods for processing incoming call information described in the above method implementations.

Implementations of the present disclosure also provide a computer program product. The computer program product includes a non-transitory computer readable storage medium storing computer programs. The computer programs are operable with a computer to accomplish all or part of the operations of any of the methods described in the above method implementations. The computer program product may be a software installation package. The computer can be a mobile terminal or other equipment.

It is to be noted that, for the sake of simplicity, the foregoing method implementations are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, or other forms of connection.

The units described as separate components may or may not be physically separate, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various implementations of the present disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random access memory (RAM), Disk or compact disc (CD), and so on.

While the present disclosure has been described in detail above with reference to the exemplary implementations, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A method for call control, comprising:
    obtaining, by a terminal device, a priority of a caller, in response to the terminal device receiving from the caller an incoming call request, the priority being determined by the terminal device according to at least one of a historical call frequency of the caller or a historical call duration of the caller;
    when the priority of the incoming call request is lower than a preset priority, the method further comprises:
        determining, by the terminal device, whether a user is in a first state;
        based on a determination that the user is in the first state, rejecting, by the terminal device, the incoming call request, and raising the priority of the caller upon receiving, from the caller, a call back request against the rejected incoming call request;
        based on a determination that the user is not in the first state, determining whether the user is in a second state;
        based on a determination that the user is in the second state, rejecting the incoming call request; and
        based on a determination that the user is not in the second state, accepting the incoming call request; and
    when the priority of the incoming call request is higher than the preset priority, the method further comprises:
        determining whether the user is in the second state;
        based on a determination that the user is in the second state, rejecting the incoming call request; and
        based on a determination that the user is not in the second state, accepting the incoming call request,
    wherein the first state is a riding state, a running state, or a climbing state, and the second state is a conference state or a sleep state.

2. The method of claim 1, wherein the first state is the riding state, and determining whether the user is in the first state comprises:
    inquiring a state of the user through a riding application;
    determining that the user is in the riding state, when the riding application shows that the user is in the riding state;
    measuring a speed of the mobile terminal via a motion sensor and determining whether the speed falls into a riding speed range, when the riding application shows that the user is not in the riding state; and
    determining that the user is in the riding state, based on a determination that the speed of the mobile terminal falls into the riding speed range.

3. The method of claim 1, wherein the first state is the running state, and determining whether the user is in the first state comprises:
    inquiring a state of the user through a pedometer application;
    determining that the user is in the running state, when the pedometer application shows that the user is in the running state;
    measuring a speed of the mobile terminal via a motion sensor and determining whether the speed falls into a running speed range, when the pedometer application shows that the user is not in the running state; and
    determining that the user is in the running state, based on a determination that the speed of the mobile terminal falls into the running speed range.

4. The method of claim 1, wherein the first state is the climbing state, and determining whether the user is in the first state comprises:
    inquiring a state of the user through a pedometer application;
    determining that the user is in the first state, in response to the pedometer application showing that the user is in the first state;
    measuring a speed and an altitude of the mobile terminal via a motion sensor, determining whether the speed falls into a speed range and whether the altitude of the mobile terminal is changing and is greater than a preset height, in response to the pedometer application showing that the user is not in the first state; and
    determining that the user is in the first state, based on a determination that the speed of the mobile terminal falls into the speed range.

5. The method of claim 1, wherein the second state is the conference state, and determining whether the user is in the second state comprises: capturing an environment of the user through a camera; and determining that the user is in the conference state, when the camera shows that the user is in a conference place.

6. The method of claim 1, wherein the second state is the sleep state, and determining whether the user is in the second state comprises: inquiring a state of the user through a sleep application; determining that the user is in the sleep state, when the sleep application shows that the user is sleeping; measuring physiological parameters of the user through a wearable device bound to the mobile terminal and determining whether each physiological parameter falls into a correspondingly preset physiological parameter range, when the sleep application shows that the user is not sleeping; and determining that the user is in the sleep state, based on a determination that each physiological parameter of the user falls into the correspondingly preset physiological parameter range.

7. A mobile terminal, comprising:
a memory configured to store programs; and
a processor coupled with the memory and configured to invoke the programs to:
 obtain a priority of a caller in response to the mobile terminal receiving from the caller an incoming call request, the priority being determined according to at least one of a historical call frequency of the caller or historical call duration of the caller;
 when the priority of the incoming call request is lower than a preset priority:
  determine whether a user is in a first state;
  based on a determination that the user is in the first state, raise the incoming call request; and raise the priority of the caller upon receiving, from the caller, a call back request against the rejected incoming call request
  based on a determination that the user is not in the first state, determine whether the user is in a second state;
  based on a determination that the user is in the second state, reject the incoming call request; and
  based on a determination that the user is not in the second state, accept the incoming call request;
 when the priority of the incoming call request is higher than the preset priority:
  determine whether the user is in the second state;
  based on a determination that the user is in the second state, reject the incoming call request; and
  based on a determination that the user is not in the second state, accept the incoming call request,
 wherein the first state is a riding state, a running state, or a climbing state, and the second state is a conference state or a sleep state.

8. The mobile terminal of claim 7, wherein the mobile terminal further comprises an application controller, and the processor is further configured to invoke the programs to inquire a state of the user via the application controller.

9. The mobile terminal of claim 8, wherein the first state is the running state or a riding state, and the processor configured to determine whether the user is in the first state is configured to:
inquire a state of the user through the application controller;
determine that the user is in the first state, when the application controller shows that the user is in the first state;
measure a speed of the mobile terminal via a motion sensor and determine whether the speed falls into a speed range, when the application controller shows that the user is not in the first state; and
determine that the user is in the first state, based on a determination that the speed of the mobile terminal falls into the speed range.

10. The mobile terminal of claim 8, wherein the first state is the climbing state, and the processor configured to determine whether the user is in the first state is configured to:
inquire a state of the user through the application controller;
determine that the user is in the first state, when the application controller shows that the user is in the first state;
measure a speed and an altitude of the mobile terminal via a motion sensor, determine whether the speed falls into a speed range and whether the altitude of the mobile terminal is changing and is greater than a preset height, when the application controller shows that the user is not in the first state; and
determine that the user is in the first state, based on a determination that the speed of the mobile terminal falls into the speed range.

11. The mobile terminal of claim 7, wherein the processor is further configured to:
determine whether the user is in a second state, based on a determination that the user is not in the first state; and
accept the incoming call request, based on a determination that the user is not in the second state.

12. The mobile terminal of claim 7, wherein the processor is further configured to:
determine whether the user is in a second state, when the priority of the incoming call request is higher than the preset priority; and
reject the incoming call request, based on a determination that the user is in the second state.

13. The mobile terminal of claim 12, wherein the processor is further configured to:
determine whether the user is in a second state, based on a determination that the user is not in the first state; and
accept the incoming call request, based on a determination that the user is not in the second state.

14. The mobile terminal of claim 12, wherein the second state is the conference state, and the processor configured to determine whether the user is in the second state is configured to:
capture an environment of the user through a camera; and
determine that the user is in the conference state, when the camera shows that the user is in a conference place.

15. The mobile terminal of claim 12, wherein the second state is the sleep state, and the processor configured to determine whether the user is in the second state is configured to:
inquire a state of the user is through a sleep application;
determine that the user is in the sleep state, when the sleep application shows that the user is sleeping;
measure physiological parameters of the user through a wearable device bound to the mobile terminal and determine whether each physiological parameter falls into a correspondingly preset physiological parameter range, when the sleep application shows the user is not sleeping; and
determine that the user is in the sleep state, based on a determination that each physiological parameter of the user falls into the correspondingly preset physiological parameter range.

* * * * *